United States Patent [19]

Clark

[11] Patent Number: 5,297,248
[45] Date of Patent: Mar. 22, 1994

[54] MULTI-COLOR ANIMATION OF COMPUTER PROGRAM EXECUTION

[75] Inventor: Andrew L. Clark, San Jose, Calif.

[73] Assignee: International Business Machines Corporation, Armonk, N.Y.

[21] Appl. No.: 957,747

[22] Filed: Oct. 7, 1992

Related U.S. Application Data

[63] Continuation of Ser. No. 546,056, Jun. 28, 1990, abandoned.

[51] Int. Cl.$^5$ ............................................. G06F 15/62
[52] U.S. Cl. .................................... 395/155; 395/161; 395/700
[58] Field of Search .......... 371/19; 395/155, 159–161, 395/600, 700; 364/DIG. 1

[56] References Cited

U.S. PATENT DOCUMENTS

| | | | |
|---|---|---|---|
| 4,080,650 | 3/1978 | Beckett | 364/200 |
| 4,730,315 | 3/1988 | Saito et al. | 371/19 |
| 4,736,321 | 4/1988 | Brown et al. | 364/300 |
| 4,821,220 | 4/1989 | Duisberg | 364/578 |
| 4,872,167 | 10/1989 | Maezawa et al. | 371/19 |
| 4,885,717 | 12/1989 | Beck et al. | 364/900 M |
| 5,146,594 | 9/1992 | Iitsuka | 364/DIG. 1 |

OTHER PUBLICATIONS

Websters New Work Dictionary-p. 94, 1986.
"IBM Process Automation for CASE" brochure, 1987.

*Primary Examiner*—Gary V. Harkcom
*Assistant Examiner*—Almis Jankus
*Attorney, Agent, or Firm*—Pryor A. Garnett; G. Marlin Knight

[57] ABSTRACT

A method for displaying statements of a computer program during an animation of the program's execution, the display using multiple colors to identify statements based on their respective frequency of execution, is disclosed. As a program statement becomes the current executed statement during the animation, the statement's frequency of execution is calculated as the number of times the statement has been executed so far during the animation, divided by the total number of statement executions throughout the animation. A display color is assigned based on whether the statement's execution frequency has reached one of two or more thresholds. The multi-hued display of program statements based on thresholds of execution frequency assists the programmer in understanding the operation of the program.

7 Claims, 7 Drawing Sheets

```
301 Open execution trace
302 TotalExecutions = total number of
    statement executions in trace
303 Get FreqThreshold(1),            /* User-specified    */
    ThresholdColor(1)                /* threshold values  */
304 Get FreqThreshold(2),            /* and colors        */
    ThresholdColor(2)
305 Get FreqThreshold(3),
    ThresholdColor(3)
306 Get FreqThreshold(4),
    ThresholdColor(4)
307 Get ExecutedColor                /* Default color     */
                                     /* for an executed   */
                                     /* statement         */
308 Get DefaultColor                 /* Default color     */
                                     /* for all other     */
                                     /* statement         */
309 PrevStmt = none
310 PrevColor = none 311 DO forever
312   Get CurrentStmt from trace     /* Next executed     */
                                     /* statement         */
313   IncremenT StmtExecutions(CurrentStmt)
      by 1
314   StmtFreq = StmtExecutions(CurrentStmt)
      / TotalExecutions
```

INITIALIZATION AND THRESHOLD CALCULATION PSEUDOCODE

*FIG. 3A*

```
315    IF StmtFreq < FreqThreshold(1) THEN
316        StmtColor = ExecutedColor
317    ELSE IF StmtFreq < FreqThreshold(2) THEN
318        StmtColor = ThresholdColor(1)
319    ELSE IF StmtFreq < FreqThreshold(3) THEN
320        StmtColor = ThresholdColor(2)
321    ELSE IF StmtFreq < FreqThreshold(4) THEN
322        StmtColor = ThresholdColor(3)
323    ELSE
324        StmtColor = ThresholdColor(4)

325    IF PrevColor = ExecutedColor THEN
326        Display PrevStmt using        /* Return previous       */
               DefaultColor              /* statement to          */
                                         /* unexecuted color      */
327    Display CurrentStmt using         /* Display current       */
           StmtColor                     /* executed statement    */
                                         /* in threshold or       */
                                         /* normal color          */
328    PrevStmt = CurrentStmt
329    PrevColor = StmtColor
330 END
```

THRESHOLD COLORING PSEUDOCODE

*FIG. 3B*

```
IGZ101I COBTEST
>>> QUALIFY primegen
IGZ101I COBTEST
>>> trace entry
IGZ101I COBTEST
>>> trace para
IGZ101I COBTEST
>>> trace name
IGZ101I COBTEST
>>> when satt (tally >= 0) (go)
IGZ101I COBTEST
>>> restart
IGZ107I ENTERING PRIMEGEN
IGZ106I TRACING PRIMEGEN
IGZ109I 000028.1      DUMMY-SECTION
IGZ103I WHEN SATT     PRIMEGEN.000028.1
IGZ103I WHEN SATT     PRIMEGEN.000029.1
IGZ103I WHEN SATT     PRIMEGEN.000030.1
IGZ103I WHEN SATT     PRIMEGEN.000031.1
IGZ103I WHEN SATT     PRIMEGEN.000032.1
IGZ103I WHEN SATT     PRIMEGEN.000033.1
IGZ103I WHEN SATT     PRIMEGEN.000034.1
IGZ109I 000049.1      CALC-LOOP
IGZ103I WHEN SATT     PRIMEGEN.000049.1
IGZ103I WHEN SATT     PRIMEGEN.000050.1
IGZ103I WHEN SATT     PRIMEGEN.000052.1
IGZ109I 000055.1
IGZ103I WHEN SATT     PRIMEGEN.000055.1
IGZ109I 000058.1
IGZ103I WHEN SATT     PRIMEGEN.000058.1
IGZ103I WHEN SATT     PRIMEGEN.000059.1
IGZ103I WHEN SATT     PRIMEGEN.000060.1
IGZ109I 000074.1      BUMP-TEST-NUMBER
IGZ103I WHEN SATT     PRIMEGEN.000074.1
IGZ103I WHEN SATT     PRIMEGEN.000075.1
IGZ109I 000049.1      CALC-LOOP
IGZ103I WHEN SATT     PRIMEGEN.000049.1
IGZ103I WHEN SATT     PRIMEGEN.000050.1
IGZ103I WHEN SATT     PRIMEGEN.000052.1
IGZ109I 000053.1
IGZ103I WHEN SATT     PRIMEGEN.000053.1
IGZ109I 000074.1      BUMP-TEST-NUMBER
IGZ103I WHEN SATT     PRIMEGEN.000074.1
IGZ103I WHEN SATT     PRIMEGEN.000075.1
```

Loop callout:
```
IGZ109I 000049.1      CALC-LOOP
IGZ103I WHEN SATT     PRIMEGEN.000049.1
IGZ103I WHEN SATT     PRIMEGEN.000050.1
IGZ103I WHEN SATT     PRIMEGEN.000052.1
IGZ109I 000055.1
IGZ103I WHEN SATT     PRIMEGEN.000055.1
IGZ109I 000058.1
```

EXAMPLE OF EXECUTION TRACE

*FIG. 4*

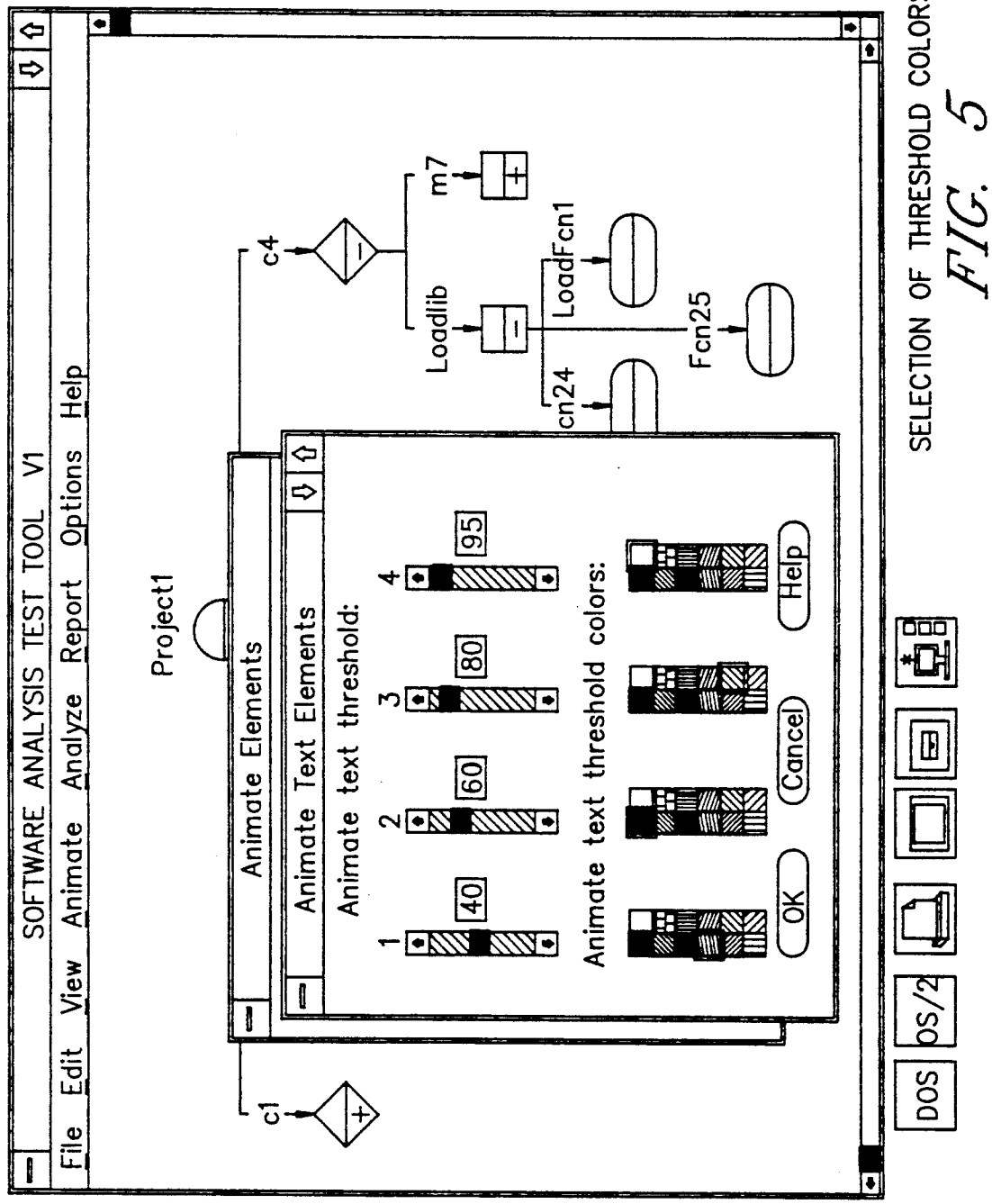
FIG. 5  SELECTION OF THRESHOLD COLORS

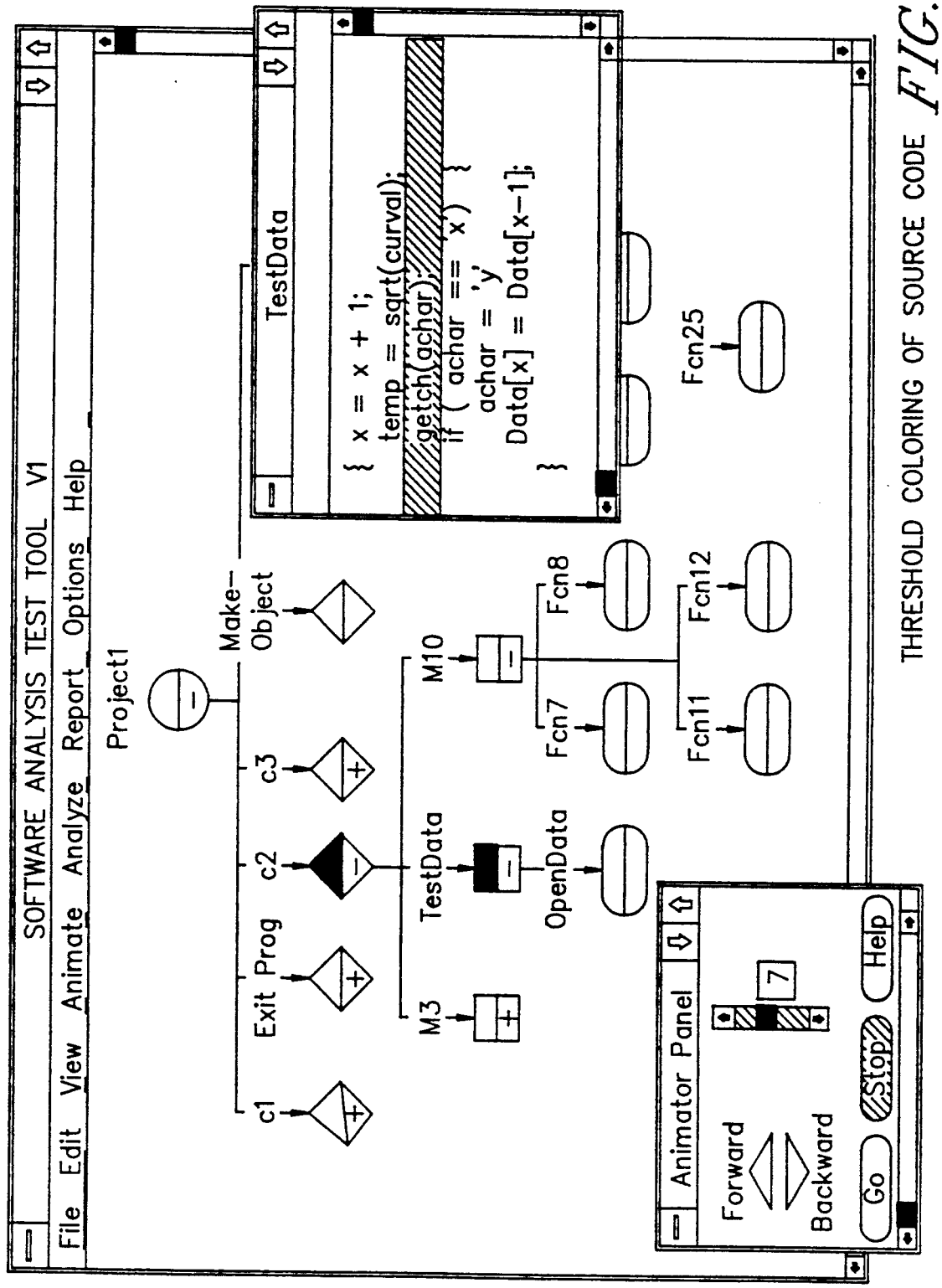
FIG. 6 THRESHOLD COLORING OF SOURCE CODE

MULTI-COLOR ANIMATION OF COMPUTER PROGRAM EXECUTION

This application is a continuation of application Ser. No. 07/546,056 filed Jun. 28, 1990 now abandoned.

BACKGROUND OF THE INVENTION

1. Technical Field

This invention relates to computer programming, and more particularly to displaying an animation of a computer program's execution.

2. Description of the Prior Art

A major challenge facing software testers is that of understanding the effect that test data has on a subject program. Techniques such as program animation bridge the gulf between the abstractness of test data and the idiomatic logic of an application under test, greatly enhancing the programmer's understanding of his or her program's operation. The programmer can then use this understanding to change the program's design to improve its performance.

Animation graphically displays the effect of executing one or more test cases for a computer program. The prior art in program animation may be categorized into two general areas: interpretive animation including SMALLTALK, ACTOR, etc., and executive animation such as in IBM's INSPECT FOR PL/I AND C/370 and PLITEST products which animate in "real time."

An interpretive animator uses an execution trace of a previously execution of the program as the source of its information about the program's execution. Interpretive animators are in control at all times, making possible such functions as reverse execution and path tracing. Duisberg, U.S. Pat. No. 4,821,220, entitled "System for Animating Program Operation and Displaying Time-based Relationships," discloses an interpretive-type animator for software objects. Duisberg's system uses time-based triggers to control a replay of an execution. In operation, the system records the original execution, saving time stamps at critical moments during the execution. Later, during replay, these time stamps are used to regulate and characterize the original program execution.

The program debuggers PLITEST, COBTEST and INSPECT of the International Business Machines Corporation (IBM), all are examples of executive animators. These products operate in real-time, and use color to highlight only the current focus of execution (i.e., the current executed statement or module) as displayed on a user's screen.

Algorithm animation is a distant cousin of interpretive and executive animation. Algorithm animators provide a scripted animation depicting a variety of classical programming data structures. These structures are animated so as to show traversal and data manipulation. Brown et al., U.S. Pat. No. 4,736,321, entitled "Communication Method Between an Interactive Language Processor Workspace and External Processes" is an example of an algorithm animator. Brown et al. disclose the invocation of an external process without having to suspend a currently executing process, passing arguments to an external process and receiving results therefrom in a currently executing APL workspace.

Saito et al., U.S. Pat. No. 4,730,315, entitled "Diagrammatic Method of Testing Program," discloses a method for correlating FORTRAN source code and a directed acyclic graph ("digraph") thereof in a step, edit, and retry interactive debug facility. Synchronism is preserved between the source code and the digraph by use of FORTRAN reserved words as pointers.

Beckett, U.S. Pat. No. 4,080,650, entitled "Facilitating Return From an On-line Debugging Program to a Target Program Breakpoint," discloses an interactive debug utility in which control is selectively passed from within one process to an external process and returned via breakpoints.

There is a need for animating the execution of a computer program in a manner which visually illustrates how the parts of a program respond to various test cases by identifying parts which reach certain user-selected thresholds during their execution.

SUMMARY OF THE INVENTION

This invention comprises an improved method for animating the execution of a computer program. The basic method displays a visual representation of parts of the program, and animates that representation of the program parts in response to execution of the program. The improvement of this invention detects when thresholds of selected event occurrences are reached for the program parts, and displays the "threshold-reaching" parts in color. In particular, the improvement detects when occurrences of a selected event for a given part of the program reach a first threshold, and colors the displayed representation of that part with a first color. Later, when a higher second threshold for that part is reached that too is detected and the displayed representation of the part is colored a second threshold color. The second threshold color is preferably of different hue than the first color.

The invention also includes an improved program animation system having a display device, display and animation means, coloring means, occurrence detection means, and threshold coloring means. The display and animation means produce an animated display of a representation of the program's parts, and the coloring means allows that displayed representation to be colored. The detection means counts event occurrences for the program parts. Each of the two coloring means detects when a first threshold is reached for a part of the program, and colors the displayed representation of that part in a respective color. The threshold colors are preferably of different hues.

The invention also includes an article of manufacture including a recording medium and means recorded on that medium. A displaying means displays a colored representation of the program parts, and that representation is animated by animation means. Detection means detects occurrences of events for the program parts, and first and second coloring means cooperate with the displaying means to color the displayed representations of the program parts with colors as respective occurrence thresholds are reached. The threshold colors are preferably of different hues.

Colored animation of the frequency of execution of the tested program's parts or "objects" vividly illustrates the program's operation, providing a "moving picture" of the program as it is executed. The addition of threshold coloring graphically illustrates the "hot spots" of a program.

Other features and advantages of this invention will become apparent from the following detailed description of the presently preferred embodiment of the in-

BRIEF DESCRIPTION OF THE DRAWINGS

FIGS. 3A and 3B are pseudocode implementations of the method of FIG. 2.

FIG. 4 shows an example of an execution trace of a COBOL program.

FIG. 5 shows an example of screen for selecting the threshold frequencies and threshold colors. The hatching of this figure represents color.

FIG. 6 shows an example of a colored representation of a program source code display with the current executed statement highlighted and with other statements colored with threshold colors. The hatching of this figure represents color.

DESCRIPTION OF THE PREFERRED EMBODIMENT

OVERVIEW

Figure 1:
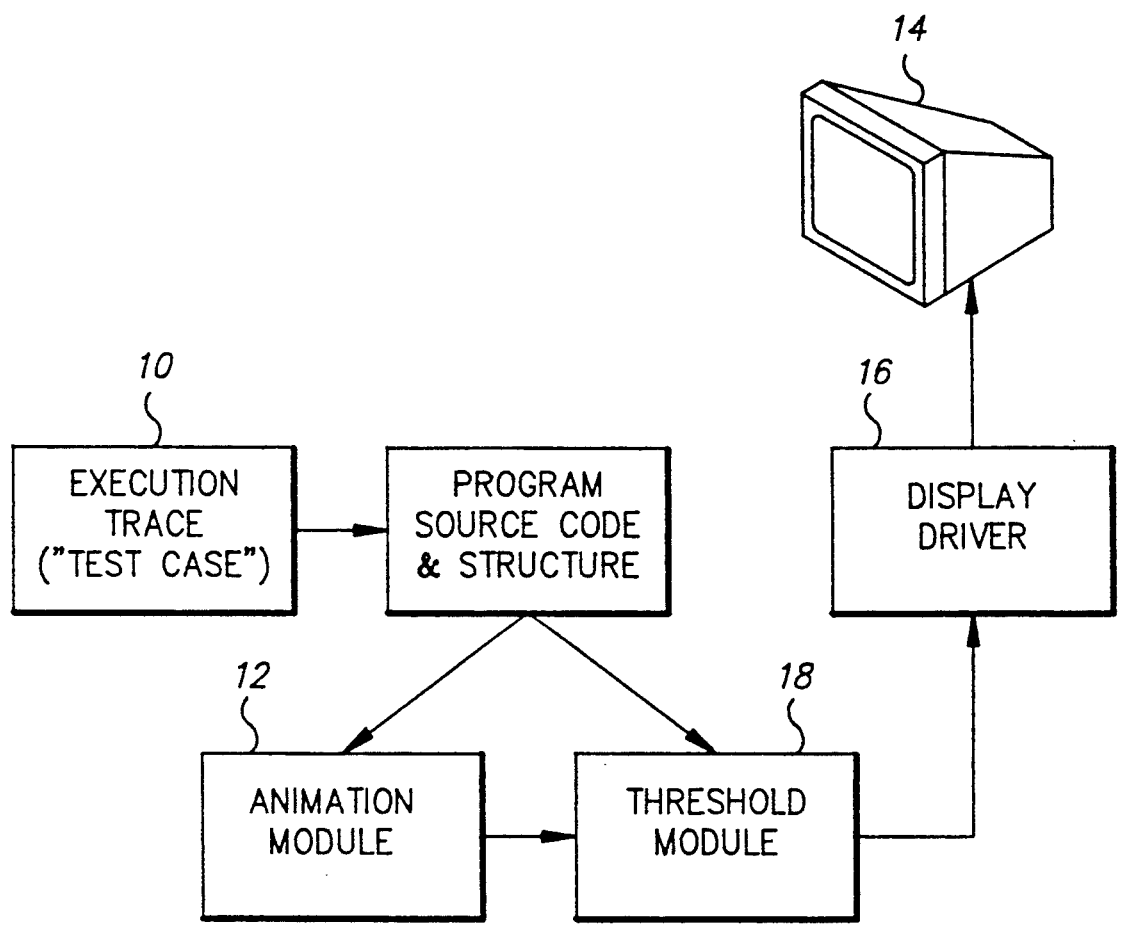
FIG. 1 is a block diagram of a computerized data processing system for coloring an animation of a computer program execution based on statement execution frequencies according to this invention.

This invention provides a colored animation of the execution of a computer program (the "tested program") which is being tested. In this context animation is the process of recreating the execution of a computer program for purposes of understanding and testing its operation. Colored animation of the frequency of execution of the tested program's parts or "objects" vividly illustrates how the program responds to various test cases, and thereby helps the program developer to refine the program's design.

The method of this invention provides multi-color animation of a program's statements, displaying the statements in colors according to certain *thresholds* of execution frequency, such as the number of times each statement has been executed relative to the total number of statement executions during the test case. As the program is animated, when a given threshold is reach for a particular statement, the color in which the statement is displayed changes to visually indicate that a threshold was reached. The colors incorporate various hues to immediately graphically identify multiple thresholds. The thresholds are user-selectable and continuously variable during the animation.

Technical Background

The method uses an execution trace 10 of the tested program produced during execution. The execution trace includes a breakdown of the number of times each statement of the tested program was executed. The execution trace is created by breakpoints inserted into the tested program during its compilation. The breakpoints cause certain state information to be recorded when the tested program is later executed. Creation of execution traces is well known in the art, and will not be discussed further except as necessary to the understanding of the invention.

Animation Module

The animation is performed by an animation module 12 of conventional design. The animation module reads through the execution trace, determining the next statement to be executed based on the execution trace. This animation module is of the interpretive type discussed above, since is relies on the execution trace 10. The choice of animation module is a matter of design choice, there being several suitable animation techniques known in the art. Accordingly, the animation module 12 is not discussed further. The animated display is produced on a color video display device 14 such as a CRT by means of a conventional display driver 16.

Threshold Calculation and Coloring

The threshold module 18 handles the calculation and coloring of program statements selected by the animation module from the execution trays. After the animation module determines the next executed statement, threshold module calculates the execution frequency for that statement. The execution frequency for any statement is equal to the number of times that statement has been executed so far during the execution trace, divided by the total number of statement executions throughout the entire execution trace. Thus as the animation proceeds through the trace, the execution frequencies for the program statements increase as the statements are executed. In the beginning, while all statements have low execution frequencies, they are displayed in a default color, with only the current executed statement being displayed in a different color.

When a particular statement in the program reaches the first threshold frequency selected by the user, the threshold module 18 displays that statement in the threshold color assigned to the first threshold, rather than in the default color for the current executed statement. Having reached the first threshold, the statement remains in the first threshold color even after execution passes to the next statement. Thus, as animation proceeds through the execution trace, statements reaching frequency thresholds assume those thresholds, respective colors thereby visually indicating those statements which are executed most frequently. When the animation of the execution trace is complete, the colors of the statements displayed on the CRT 14 immediately identify in distinctive hues those statements which were executed most.

Figure 2:
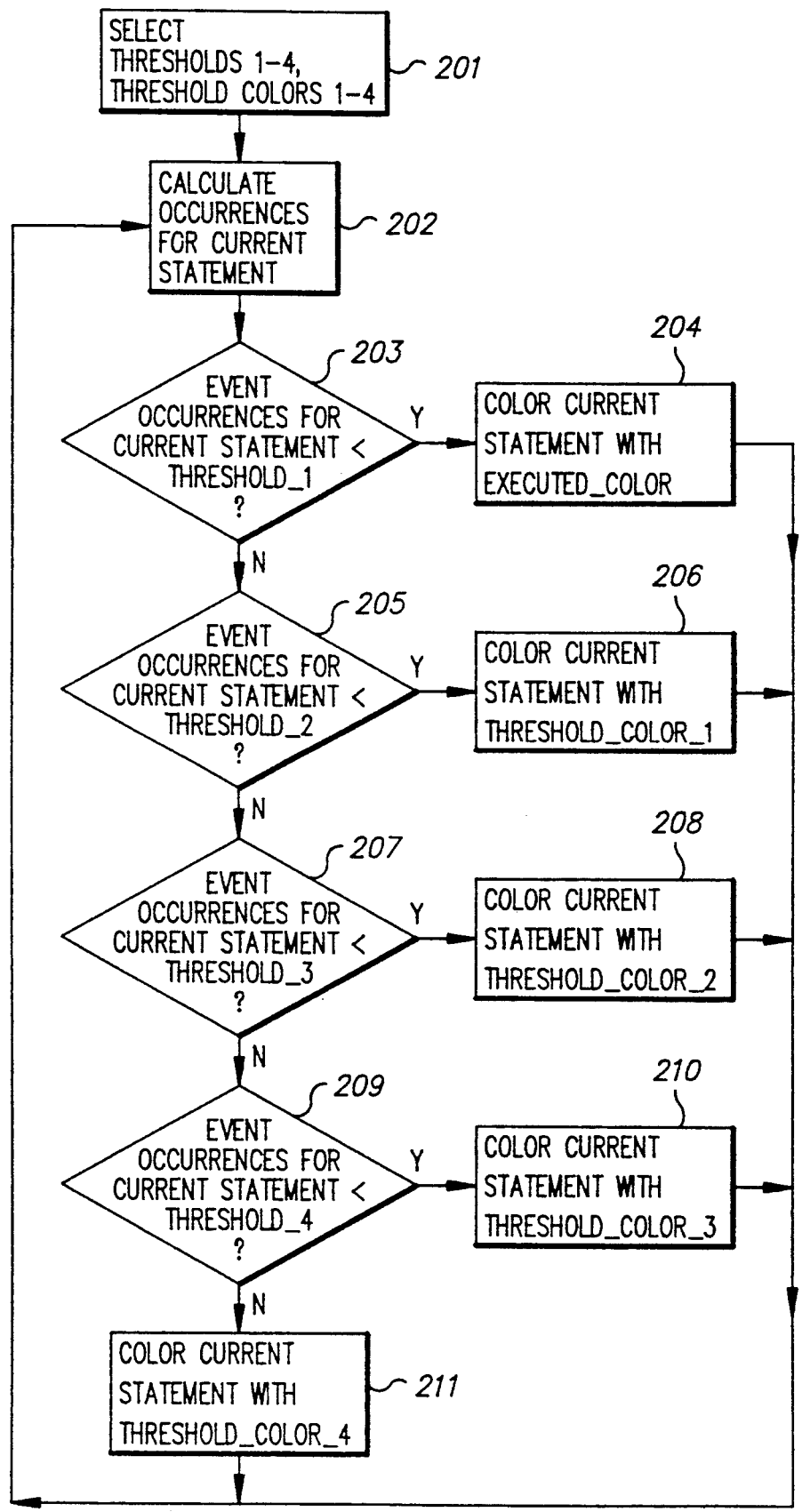
FIG. 2 is a flowchart of a method for coloring an animation of a computer program execution based on statement execution frequencies according to the preferred embodiment of this invention.

This method is shown in the flow chart of FIG. 2 and the pseudocode of FIGS. 3A and 3B. Referring first to the flow chart of FIG. 2, after the frequency thresholds and threshold colors are selected 201, the animation loops through each of the executed statements. As each executed statement becomes the "current statement" its number of executions is incremented by one and its execution frequency is recalculated 202. If its execution frequency is lower than the first threshold 203, the current statement is colored with the normal color for the current executed statement 204, rather than one of the threshold colors. However, if the first threshold is reached, then the current statement's execution frequency is tested against the second threshold frequency 205. If the first threshold has been reached 203 but the second threshold has not 205, then the statement is colored with the first threshold color 206. Similarly, the current statement is colored with the second and third threshold colors 208, 210. If the fourth threshold has been reached, then the statement is immediately colored with the fourth threshold color 211. After the statement has been colored on the display, the method loops to take up the next statement in the animation.

Referring now to the pseudocode of FIG. 3A, when the execution trace is first opened 301, a total number of statement executions in the trace is stored 302. The fourth frequency thresholds and their respective threshold colors are obtained from the user 303 and 306, together with the default colors for the current executed statement 307 and for all other statements 308. An infinite do-loop 311–330 takes up each executed statement in turn from the execution trace 312. A table of the number of times each statement has been executed so far during the trace is updated for the current statement 313, and the current statement's execution frequency is calculated 314. Referring now to FIG. 3B, current statement's execution frequency is then compared in turn with each of the frequency thresholds 315–322. As discussed above for the flow chart of FIG. 2, the current statement is colored with the threshold color of the highest threshold exceeded by that statement or with the default colored one for the current executed statement if no threshold has been reached. The current executed statement is then displayed using the color assigned at lines 315–324, and the next statement in the trace is taken up 330.

Advantages over the Prior Art

The advantages of the method of the preferred embodiment of this invention are apparent. By providing a multi-hued display of the execution frequency of program statements, this invention allows the programmer to immediately grasp the total gestalt of the program's execution.

Complementary and Alternative Embodiments

A first complementary embodiment of this invention comprises a data processing system including a general purpose digital computer programmed to execute the method of the invention, and a display device such as a CRT. Such a computer is a well known article of commerce, such as the PS/2 personal computer of IBM, and is not described further.

A second complementary embodiment comprises an article of manufacture for distributing a computer program for performing the method of this invention. Such an article comprises a recording medium upon which are recorded the computer instructions for performing the steps of the method of the invention. The medium is preferably a magnetic tape such as the 3½ inch (approx. 8½ cm) removable magnetic diskette used in a PS/2 personal computer. The instructions are recorded on the medium by conventional bulk-recording techniques and devices which are well known in the art, and which are not described further.

It will be appreciated that, although specific embodiments of the invention have been described herein for purposes of illustration, various modifications may be made without departing from the spirit and scope of the invention. In particular, the threshold-based coloring may be performed on a graphical representation of the program rather than on the source code. Also, beyond threshold coloring of statement executions, other events such as input/output (I/O) requests, exceptions conditions and errors may be monitored and displayed using threshold colors. Further, beyond frequencies of occurrences, other measures of events such as absolute numbers (e.g., $>0$ error conditions, $>100$ I/O requests per second) may be monitored and displayed using threshold colors. The animation of the execution trace may be done in both forward and reverse directions. In the reverse direction the numbers of occurrences would be decremented, rather than incremented as for the forward direction. Furthermore, the use of threshold coloring is equally applicable to executive and algorithmic animation as to the interpretive animation discussed above.

Accordingly, the scope of protection of this invention is limited only by the following claims and their equivalents.

I claim:

1. An improved method for displaying on a computer display the execution sequence of a computer program as recorded in a set of trace statements, the improvement comprising the steps of:
   (a) determining a total statement execution count (total count) using the set of trace statements; and
   (b) sequentially processing the set of trace statements in a forward direction determining a current statement and for each current statement performing the steps of:
      (i) incrementing a count variable associated with the current statement;
      (ii) calculating an execution frequency by dividing the associated count variable by the total count; and
      (iii) displaying data representative of the current statement on the display in a selected color based on the execution frequency by determining a first and second threshold frequency, the second threshold frequency being greater than the first threshold frequency, selecting a first color if the execution frequency is less than the first threshold frequency, selecting a second color if the execution frequency is greater than or equal to the first threshold frequency and less than the second threshold frequency, and selecting a third color if the execution frequency is greater than or equal to the second threshold frequency.

2. The method of claim 1, wherein the data representative of the current statement is in source code format.

3. The method of claim 1 further comprising the steps of:
   sequentially processing the set of trace statements in a backward time direction determining a current statement and for each current statement performing the steps of:
      (i) decrementing the count variable associated with the current statement;
      (ii) calculating an execution frequency by dividing the associated count variable by the total count; and
      (iii) displaying data representative of the current statement on the display in a selected color based on the execution frequency.

4. In a computerized data processing system, having means for recording a set of trace statements, the improvement comprising:
   (a) means for determining a total statement execution count (total count) using the set of trace statements; and
   (b) means for sequentially processing the set of trace statements in a forward direction determining a current statement and performing for each current statement the steps of:
      (i) incrementing a count variable associated with the current statement;

(ii) calculating an execution frequency by dividing the associated count variable by the total count; and (iii) displaying data representative of the current statement on the display in a selected color based on the execution frequency;

(c) means for determining a first and second threshold frequency, the second threshold frequency being greater than the first threshold frequency;

(d) means for selecting a first color if the execution frequency is less than the first threshold frequency;

(e) means for selecting a second color if the execution frequency is greater than or equal to the first threshold and less than the second threshold frequency; and (f) means for selecting a third color if the execution frequency is greater than or equal to the second threshold frequency.

5. The improvement of claim 4, wherein the data representative of the current statement is in source code format.

6. The improvement of claim 4 further comprising:

means for sequentially processing the set of trace statements in a backward time direction determining a current statement and for each current statement performing the steps of:

(i) decrementing the count variable associated with the current statement;

(ii) calculating an execution frequency by dividing the associated count variable by the total count; and (iii) displaying data representative of the current statement on the display in a selected color based on the execution frequency.

7. A method for displaying on a computer display the execution sequence in both a forward and backward time direction of a computer program as recorded in a set of trace statements, the method comprising the steps of:

(a) determining a total statement execution count (total count) using the set of trace statements; and (b) sequentially processing the set of trace statements in a forward direction determining a current statement and for each current statement performing the steps of:

(i) incrementing a count variable associated with the current statement;

(ii) calculating an execution frequency by dividing the associated count variable by the total count; and (iii) displaying data representative of the source code for the current statement on the display in a selected color based on the execution frequency by determining a first and second threshold frequency, the second threshold frequency being greater than the first threshold frequency, selecting a first color if the execution frequency is less than the first threshold frequency, selecting a second color if the execution frequency is greater than or equal to the first threshold frequency and less than the second threshold frequency, and selecting a third color if the execution frequency is greater than or equal to the second threshold frequency; and (c) sequentially processing the set of trace statements in a backward time direction determining a current statement and for each current statement performing the steps of:

(i) decrementing the count variable associated with the current statement;

(ii) calculating an execution frequency by dividing the associated count variable by the total count; and (iii) displaying data representative of the source code for the current statement on the display in a selected color based on the execution frequency by determining a first and second threshold frequency, the second threshold frequency being greater than the first threshold frequency, selecting a first color if the execution frequency is less than the first threshold frequency, selecting a second color if the execution frequency is greater than or equal to the first threshold frequency and less than the second threshold frequency, and selecting a third color if the execution frequency is greater than or equal to the second threshold frequency.

* * * * *